Figure 1:
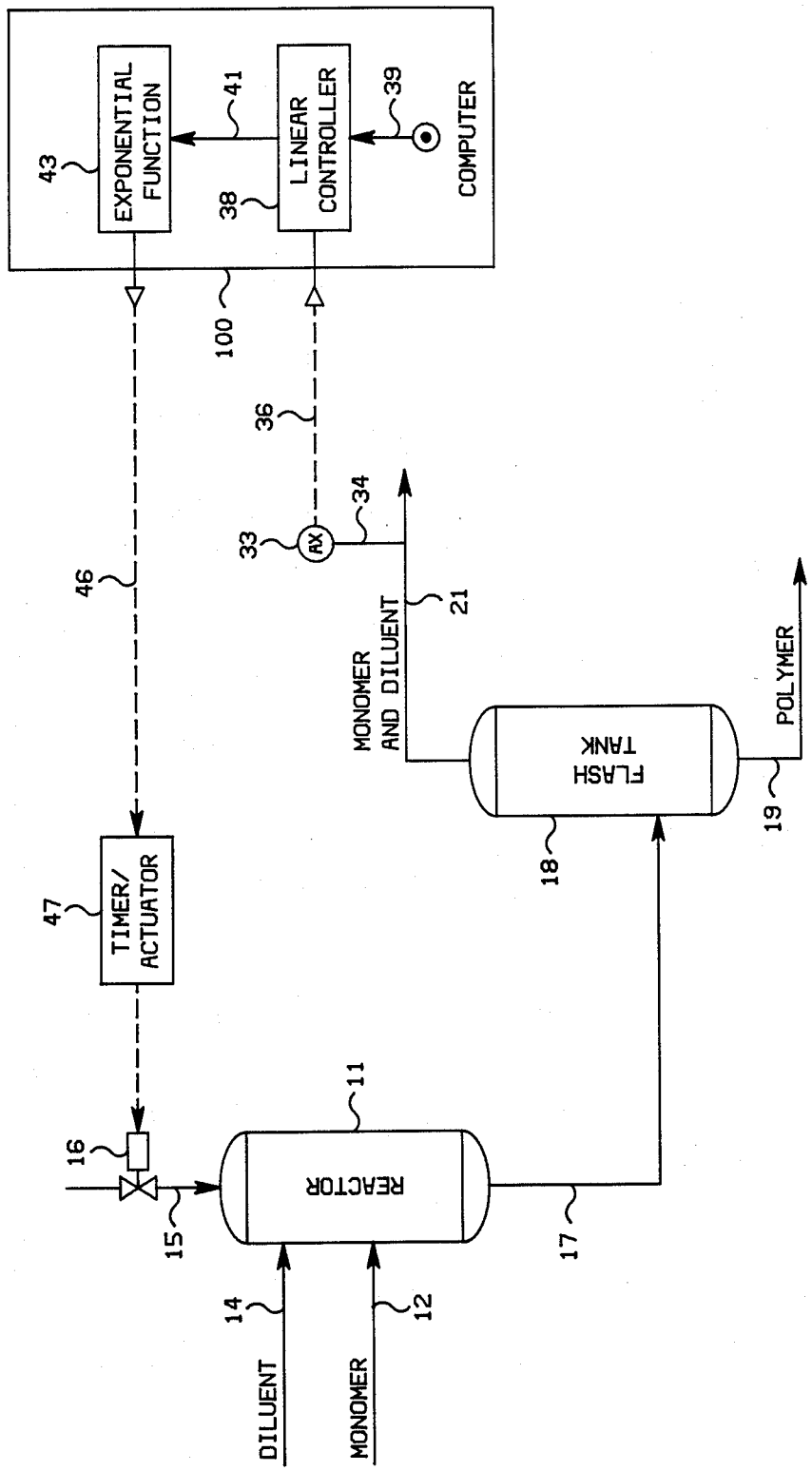

United States Patent [19]

Webb et al.

[11] Patent Number: 4,619,901
[45] Date of Patent: Oct. 28, 1986

[54] CONTROL OF POLYMERIZATION REACTION

[75] Inventors: Don W. Webb; William B. Bard, both of Bartlesville, Okla.

[73] Assignee: Phillips Petroleum Company, Bartlesville, Okla.

[21] Appl. No.: 704,104

[22] Filed: Feb. 21, 1985

[51] Int. Cl.[4] .............................. B01J 8/08; B01J 31/08
[52] U.S. Cl. ........................................ 436/55; 422/62; 436/142; 526/59
[58] Field of Search ..................... 422/62, 110, 111; 436/55, 142; 364/499, 500; 526/59

[56] References Cited

U.S. PATENT DOCUMENTS

| | | | |
|---|---|---|---|
| 3,108,094 | 10/1963 | Morgan | 260/94.9 |
| 3,659,171 | 4/1972 | Morgan | 318/443 |
| 3,951,604 | 4/1976 | Smith et al. | 23/253 |
| 3,998,995 | 4/1976 | Smith et al. | 23/253 |
| 4,007,361 | 2/1977 | Martin | 235/150.1 |
| 4,054,780 | 10/1977 | Bartley et al. | 364/106 |
| 4,092,722 | 5/1978 | Hofferber et al. | 422/110 |
| 4,186,384 | 1/1980 | Acker | 340/347 |
| 4,239,493 | 12/1980 | Niemi et al. | 422/62 |
| 4,417,312 | 11/1983 | Cromin et al. | 364/510 |
| 4,533,517 | 8/1985 | Hofferber | 436/55 |

Primary Examiner—Michael S. Marcus
Attorney, Agent, or Firm—French and Doescher

[57] ABSTRACT

A desired unreacted monomer concentration is maintained in the reaction effluent removed from a polymerization reactor by manipulating the catalyst feed rate to the polymerization reactor based on a non-linear control signal derived from a comparison of actual and desired unreacted monomer concentration.

4 Claims, 1 Drawing Figure

CONTROL OF POLYMERIZATION REACTION

This invention relates to control of a polymerization reaction. In one aspect this invention relates to method and apparatus for maintaining a desired unreacted monomer concentration for a polymerization reaction.

In a typical polymerization reaction, monomer, diluent and catalyst are fed to a reactor where the monomer is polymerized. The diluent does not react but is typically utilized to control solids concentration and also to provide a convenient mechanism for introducing the catalyst into the reactor. The mixture of polymer, diluent and unreacted monomer are removed from the reactor and fed to a flash tank where the polymer is separated from the diluent and unreacted monomer. Typically, the catalyst will be contained in the polymer.

Catalyst is fed into the reactor through a special valve which is generally referred to as a ball check feeder or shot feeder. The valve fills with a mixture of catalyst and diluent. Periodically, the catalyst feeder valve is actuated and this mixture is dumped into the reactor. The catalyst feeder valve is then recycled to a closed position and is refilled in preparation for the next actuation.

It is important to control the concentration of the unreacted monomer because some of the properties of the polymer produced, such as melt index, are highly dependent on the unreacted monomer concentration. In the past, the unreacted monomer concentration has generally been controlled by manipulating either the monomer feed rate or the diluent feed rate. However, this type of control would mean that either the solids concentration or the production rate of polymer would not be controlled which is undesirable.

Another method which could be employed to control the concentration of the unreacted monomer would be to control the addition of catalyst so as to maintain a desired unreacted monomer concentration. This could be accomplished by using a controller to compare the actual unreacted monomer concentration to the desired unreacting monomer concentration with the results of the comparison being utilized to directly control the catalyst addition so as to maintain the actual unreacted monomer concentration substantially equal to the desired unreacted monomer concentration. However, the output from a controller is generally linear in nature. By this it is meant that, once the output of the controller is scaled as will be described more fully hereinafter, the controller will make a specific adjustment in the catalyst addition rate for a given error condition (difference between actual and desired unreacted monomer concentration). However, in a typical polymerization reaction, the catalyst activity may vary from day to day. Under these circumstances, different changes in the rate of catalyst addition are required to correct for the same deviation. Also, the volume of catalyst added by the catalyst feeder valve may be changed which would also change the effect of a specific change in catalyst feed rate.

It is thus an object of this invention to provide method and apparatus for maintaining a desired unreacted monomer concentration for a polymerization reaction by implementing a nonlinear type of control of catalyst feed rate so as to maintain a desired unreacted monomer concentration even when catalyst activity changes, catalyst feeder volume changes or some other factor changes which would affect the magnitude of the change in catalyst feed rate required to correct for a deviation from the set point for the unreacted monomer concentration.

In accordance with the present invention, method and apparatus is provided whereby the output of a linear controller is considered the natural log of the required catalyst dump rate. The actual dump rate is thus the base e raised to the power represented by the output of the linear controller. This actual dump rate is utilized to control the addition of catalyst to the polymerization reaction in such a manner that a desired unreacted monomer concentration is maintained.

Other objects and advantages of the invention will be apparent from the foregoing brief description of the invention and the claims as well as the detailed description of the drawing which is breifly described as follows:

FIG. 1 is a diagramatic illustration of a polymerization reaction system and the associated control system of the present invention.

The invention is described in terms of the polymerization of ethylene. However, the invention is applicable to any polymerization reaction where a catalyst is introduced periodically and it is desired to control the unreacted monomer concentration.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on a measured process parameter as well as set points supplied to the computer. Other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The digital controller shown may utilize the various modes of control such as proportional, proportional-integral, proportional-derivative, or proportional-integral-derivative. In this preferred embodiment, a proportional-integral-derivative controller is utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specificed temperature.

As has been previously stated, the digital controller shown is a linear controller. To scale a linear controller to control catalyst dump rate, it would be necessary to assume a constant catalyst activity and a constant amount of catalyst added per dump. A determination is then made of what effect a change in the dump rate has on unreacted monomer concentration. As an example, assume that a change in the catalyst dump rate of 4 dumps per hour to 5 dumps per hour results in a decreased in unreacted monomer concentration of 10 percent. In such a case, a linear controller would be scaled such that, if the difference between actual unreacted monomer concentration and desired unreacted monomer concentration is 10 percent, then the dump rate would be increased by 20 percent. Also, if the difference between unreacted monomer concentration and desired unreacted monomer concentration is 5 percent, then the dump rate would be changed by 10 percent. Thus, a linear relationship is established between the deviation (difference between actual and desired) and the output from the controller.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value in therefore one from which the information regarding the measured or desired value can be readily retrieved regardless of the exact mathematical relationship between the signal units and the measured or desired process units.

Referring now to FIG. 1, there is illustrated a polymerization reactor 11. Ethylene is provided to the polymerization reactor 11 through conduit 12. In like manner, a diluent such as isobutane is provided to the polymerization reactor 11 through conduit 14 and a catalyst, such as a typical chromium oxide on silica catalyst or silica-titania catalyst, is provided to the polymerization reactor 11 through conduit 15. As has been previously stated, the catalyst flowing through conduit 15 will be introduced periodically into the reactor 11. This is accomplished by use of the catalyst feeder valve 16 which is operably located in conduit 15.

The reaction effluent is removed from the reactor 11 through conduit 17 and is provided to the flash tank 18. The reaction effluent will be made up of polyethylene, unreacted ethylene, and isobutane. The catalyst will generally be contained in the polyethylene.

The polyethylene is separated from the unreacted ethylene and the isobutane in the flash tank 18. Polyethylene is removed from the flash tank 18 through conduit 19. Unreacted ethylene and isobutane are removed from the flash tank 18 through conduit 21.

The polymerization reaction system described to this point is conventional. It is the manner in which the polymerization reaction system is controlled so as to maintain a desired unreacted ethylene concentration that provides the novel features of the present invention.

A sample of the fluid flowing through conduit 21 is provided to the analyzer transducer 33 through conduit 34. The analyzer transducer 33 is preferably a chromatographic analyzer such as the OPTICHROM 102 chromatographic analyzer from Applied Automation, Inc., Bartlesville, Okla. The analyzer transducer 33 provides an output signal 36 which is representative of the concentration of ethylene in the fluid flowing through conduit 21. Essentially, signal 36 is representative of the concentration of unreacted ethylene removed from the reactor 11. Signal 36 is provided from the analyzer transducer 33 as an input to computer 100 and is specifically provided to the controller block 38.

The controller block 38 is also provided with a set point signal 39 which is representative of the desired unreacted ethylene concentration. In response to signals 36 and 39, the controller block 38 provides an output signal 41 which is responsive to the difference between signals 36 and 39. Signal 41 is scaled so as to be representative of the natural log of the dump rate for the catalyst (number of actuations of the catalyst feeder valve 16 per unit time) required to maintain the actual unreacted ethylene concentration substantially equal to the desired unreacted ethylene concentration represented by signal 39. Again, since a linear controller is being utilized, signal 41 assumes a constant catalyst activity and a constant catalyst volume per dump and these constants are taken into account in the scaling of signal 41 as previously described. Signal 41 is provided from the linear controller block 38 as an input to the exponential function block 43.

The output signal 46 from the exponential function block 43 is representative of the dump rate for the catalyst required to maintain the actual unreacted ethylene concentration substantially equal to the desired unreacted ethylene concentration. If both signals 46 and 41 are considered signals which are functions of time and signal 46 is designated as m(t) while signal 41 is designated as o(t), then the desired relationship between signal 41 and signal 46 is given by Equation 1

$$\frac{d\,m(t)}{dt} = m(t)\frac{d\,o(t)}{dt}. \quad (1)$$

This relationship yields increased differential changes in m(t) as the magnitude of m(t) increases which is the desired result. Solving Eqauation 1 for m(t) gives Equation 2

$$m(t) = Ke^{o(t)} \quad (2)$$

where K is a constant. Thus, signal 41 is a function of the natural logarithm of signal 46.

The magnitude of the constant K is included in the proportional gain term determined for the linear controller.

As previously stated, signal 46 is supplied as the control signal to the timer/actuator 47. The timer/actuator is preferably a computing controller such as a TOS-DIC-212 supplied by Toshiba. The timer/actuator 47 manipulates the catalyst feeder valve 16 in such a manner that the catalyst is dumped into the reactor 11 at the rate represented by signal 46.

Essentially, signal 46 is a nonlinear control signal based on the comparison of the actual and desired unreacted ethylene concentration. The exponential function compensates for variations in catalyst activity or variations in amount of catalyst introduced into the reactor per dump. Thus, while signal 41 is linear with respect to unreacted ethylene concentration, signal 46 is not. If the current dump rate for the catalyst represented by signal 46 is 2 dumps per minute, a change of 0.2 dumps per minute may be made in the magnitude of signal 46 to correct for a certain concentration error e. However, if the current dump rate set point is 1.0 dumps per minute, the same error e would result in an adjustment of the set point by 0.1 dumps per minute. This provides a more effective control than linear control based directly on signal 41.

The invention has been described in terms of a preferred embodiment as illustrated in FIG. 1. A catalyst feeder valve which may be utilized is a Seiscor Ball Check Feeder Valve.

For reasons of brevity and clarity, conventional auxilliary equipment such as pumps and other process equipment have not been included in the above description as they play no part in the explanation of the invention. Also, additional measurement-control devices such as the devices which would be utilized to control the flow rate of the diluent and the ethylene have not been illustrated since control of the flow rate of the diluent and the monomer do not play any part in the explanation of the invention.

While the invention has been described in terms of the presently preferred embodiment, reasonable variations and modifications are possible by those skilled in the art and such variations are within the scope of the described invention and the appended claims.

That which is claimed:

1. A method for maintaining a desired unreacted monomer concentration in the reaction effluent withdrawn from a polymerization reactor, wherein monomer is provided as a feed to said polymerization reactor, wherein catalyst is provided periodically through a catalyst feeder valve to said polymerization reactor and wherein said reaction effluent contains polymer and unreacted monomer, said method comprising the steps of:
    establishing a first signal representative of the actual unreacted monomer concentration in said reaction effluent;
    establishing a second signal representative of the desired unreacted monomer concentration in said reaction effluent;
    using a linear controller to compare said first signal and said second signal and to establish a third signal which is responsive to the difference between said first signal and said second signal, wherein said third signal is scaled so as to be representative of the number of times said catalyst feeder valve should be actuated per unit time in order to maintain the magnitude of said first signal substantially equal to the magnitude of said second signal if said catalyst has a constant activity and the same amount of said catalyst is introduced into said polymerization reaction by each actuation of said catalyst feeder valve;
    establishing a fourth signal representative of the exponential of said third signal, wherein the conversion of said third signal to an exponential compensates for variations in the activity of said catalyst and variations in the amount of said catalyst introduced into said polymerization reactor each time said catalyst feeder valve is actuated; and
    actuating said catalyst feeder valve in response to said fourth signal.

2. A method in accordance with claim 1 additionally comprising the steps of:
    providing said reaction effluent as a feed to a flashtank;
    widthdrawing an overhead stream from said flashtank;
    withdrawing a bottoms stream containing polymer from said flashtank;
    establishing said first signal based on an analysis of the overhead stream withdrawn from said flashtank.

3. Apparatus comprising:
    a polymerization reactor;
    means for providing monomer to said polymerization reactor;
    a catalyst feeder valve for periodically introducing catalyst into said polymerization reactor;
    means for removing the reaction effluent containing polymer and unreacted monomer from said polymerization reactor;
    means for establishing a first signal representative of the actual unreacted monomer concentration in said reaction effluent;
    means for establishing a second signal representative of the desired unreacted monomer concentration in said reaction effluent;
    a linear controller for comparing said first signal and said second signal and for establishing a third signal which is responsive to the difference between said first signal and said second signal, wherein said third signal is scaled so as to be representative of the number of times said catalyst feeder valve should be actuated per unit time in order to maintain the magnitude of said first signal substantially equal to the magnitude of said second signal if said catalyst has a constant activity and the same amount of said catalyst is introduced into said polymerization reaction by each actuation of said catalyst feeder valve;

means for establishing a fourth signal representative of the exponential of said third signal, wherein the conversion of said third signal to an exponential compensates for variations in the activity of said catalyst and variations in the amount of said catalyst introduced into said polymerization reactor each time said catalyst feeder valve is actuated; and means for actuating said catalyst feeder valve in response to said fourth signal.

4. Apparatus in accordance with claim 1 additionally comprising:

a flashtank;

means for providing said reaction effluent as a feed to said flashtank;

means for withdrawing an overhead stream from said flashtank; and means for withdrawing a bottoms stream containing polymer from said flashtank, wherein said first signal is established based on an analysis of the overhead stream withdrawn from said flashtank.

* * * * *